(12) United States Patent
Paulsen et al.

(10) Patent No.: US 7,498,969 B1
(45) Date of Patent: Mar. 3, 2009

(54) PROXIMITY RADAR ANTENNA CO-LOCATED WITH GPS DRA FUZE

(75) Inventors: Lee M. Paulsen, Cedar Rapids, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 26 days.

(21) Appl. No.: 11/701,696

(22) Filed: Feb. 2, 2007

(51) Int. Cl.
*F41G 7/28* (2006.01)
*F42B 15/01* (2006.01)
*F42C 13/04* (2006.01)
*H01Q 1/28* (2006.01)
*G01S 13/88* (2006.01)
*H04B 7/185* (2006.01)

(52) U.S. Cl. ............... 342/68; 342/357.06; 342/357.14; 343/705; 102/211; 102/214; 244/3.19

(58) Field of Classification Search ................... 342/68, 342/357.1, 357.14, 357.06; 343/893, 911 R, 343/705–708; 102/211–214; 244/3.19
See application file for complete search history.

(56) References Cited

U.S. PATENT DOCUMENTS

| | | | | |
|---|---|---|---|---|
| 3,798,653 | A * | 3/1974 | Jones, Jr. ..................... 343/708 |
| 4,037,540 | A * | 7/1977 | Keydel ........................ 102/214 |
| 4,388,388 | A * | 6/1983 | Kornbau et al. ............. 430/258 |
| 5,657,947 | A * | 8/1997 | Mayersak .................. 244/3.19 |
| 5,726,664 | A * | 3/1998 | Park et al. .................... 343/705 |
| 6,098,547 | A * | 8/2000 | West ........................... 102/214 |
| 6,307,514 | B1 * | 10/2001 | West ........................... 343/705 |
| 6,481,666 | B2 * | 11/2002 | Frucht ........................ 244/3.15 |
| 6,615,734 | B2 * | 9/2003 | Koch et al. ................... 102/213 |
| 6,700,539 | B2 * | 3/2004 | Lim ..................... 343/700 MS |
| 6,762,658 | B1 * | 7/2004 | Isomura et al. ............. 333/202 |
| 6,834,591 | B2 * | 12/2004 | Rawcliffe et al. ........... 102/214 |
| 6,867,737 | B1 * | 3/2005 | Ryken et al. .......... 343/700 MS |
| 6,892,646 | B1 * | 5/2005 | Zimmerman et al. ........ 102/293 |
| 6,900,764 | B2 * | 5/2005 | Kingsley et al. ...... 343/700 MS |
| 6,919,840 | B2 * | 7/2005 | Friedrich et al. ............. 342/68 |
| 7,057,567 | B2 * | 6/2006 | Koch .......................... 343/708 |
| 7,121,210 | B2 * | 10/2006 | Steele ......................... 102/211 |
| 7,219,589 | B2 * | 5/2007 | Gibson et al. ................ 89/1.11 |
| 7,423,591 | B2 * | 9/2008 | Fox ..................... 343/700 MS |
| 2008/0142591 | A1 * | 6/2008 | Jenkins et al. ............... 235/411 |

OTHER PUBLICATIONS

Three orthogonal polarisation DRA-monopole ensemble Gray, D. and Watanabe, T. Electronics Letters May 15, 2003, vol. 39 Issue 10.*

* cited by examiner

*Primary Examiner*—Thomas H Tarcza
*Assistant Examiner*—Cassi Galt

(57) ABSTRACT

The present invention is directed to a fuze application capable of GPS (Global Positioning System) and proximity radar functionality by co-locating a proximity radar antenna with a GPS DRA (Dielectric Resonator Antenna) fuze. The GPS DRA fuze has a $HE_{11\delta}$ mode structure resulting in an E-field null at the center. The monopole proximity radar antenna is mounted in the E-field null center and is thus electrically isolated from the GPS DRA fuze. The high dielectric constant permits the GPS DRA fuze to operate in the L1 frequency and the electrically shortened proximity radar antenna to resonate in the C-Band within a small form factor. The GPS DRA fuze maintains a forward-looking CP (circular polarization) pattern while proximity antenna maintains a desirable monopole pattern. Nesting allows mounting of both GPS and proximity radar antennas on the fuze nose while reducing the total space occupied.

23 Claims, 3 Drawing Sheets

DRA with Prox Radar Monopole

GPS Fuselage Patches

GPS Top-Loaded Monopole

PROXIMITY RADAR ANTENNA CO-LOCATED WITH GPS DRA FUZE

FIELD OF THE INVENTION

The present invention relates generally to fuze applications and more particularly to a proximity radar antenna co-located with a GPS (Global Positioning System) DRA (Dielectric Resonator Antenna) fuze.

BACKGROUND OF THE INVENTION

A fuze is a mechanical and/or electrical device typically located at the leading end of a delivery system, such as an artillery shell, designed to control detonation. Delivery systems, such as artillery shells, utilize various technologies to accurately control detonation in order to maximize damage to the target while minimizing collateral damage. Fuze applications may utilize GPS (Global Positioning System) functionality for flight and proximity radar functionality for descent. GPS and proximity radar provide fuze applications with improved accuracy and detonation control, thus reducing collateral damage.

Typically, fuze applications have either GPS antennas or proximity radar antennas located on the tip of the fuze. The tip of the fuze is an ideal location for both antennas. However, due to space and interference considerations, the proximity antenna is typically mounted on the fuse tip. Fuze application antenna configurations with either GPS antennas located on the side of the fuze are subject to performance degradation such as carrier-phase roll-up. It would be optimal to mount antennas for both GPS and proximity radar on the nose of the fuse.

Consequently, it would be desirable to provide a nose-mounted fuze antenna capable of optimal GPS and proximity radar operations.

SUMMARY OF THE INVENTION

Accordingly, the present invention is directed to a fuze application utilizing a proximity radar antenna co-located with a GPS (Global Positioning System) DRA (Dielectric Resonator Antenna) fuze.

The GPS DRA fuze operates in the L1 frequency and has a $HE_{11\delta}$ mode structure resulting in an E-field null at the center of the GPS DRA fuze's DRA dielectric cone. The proximity radar antenna is a monopole, located within GPS DRA fuze, resonates in the C-Band. The proximity radar antenna is mounted in the E-field null in the center of the DRA dielectric cone, electrically isolating the proximity radar antenna from the GPS DRA fuze.

The present invention provides a nose-mounted fuze antenna capable of optimal GPS and proximity radar operations. Due to the $HE_{11\delta}$ mode structure of the GPS DRA fuze, an E-field null exists at the center of the DRA dielectric cone, allowing for benign insertion of proximity radar antenna while keeping the GPS DRA fuze and the proximity radar electrically isolated from each other. The high dielectric constant of DRA dielectric cone permits the GPS DRA fuze to operate in the L1 frequency and the electrically shortened proximity radar antenna to resonate in the C-Band within a small form factor. The GPS DRA fuze maintains a forward-looking CP (circular polarization) pattern while proximity antenna maintains a desirable LP (linear polarization) monopole pattern. Nesting the proximity radar antenna inside the GPS DRA fuze allows both antennas to be mounted on the fuze nose while simultaneously reducing the total amount of space occupied by antennas.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the invention, examples of which are illustrated in the accompanying drawings.

Figure 1:
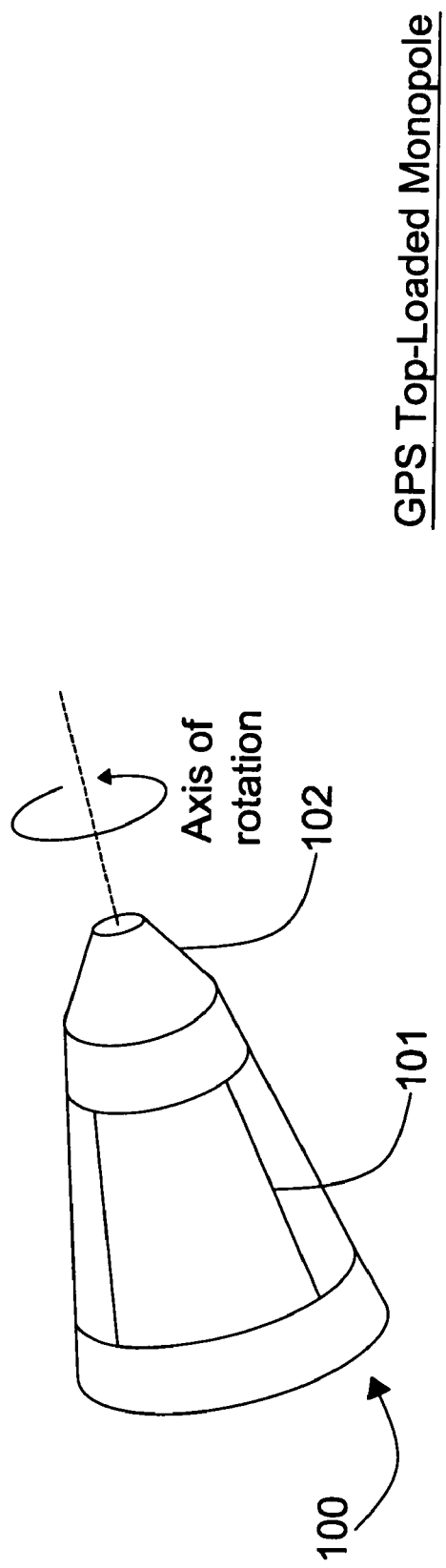
FIG. 1 is a block diagram illustrating the GPS and proximity radar antenna configuration of a fuze, as is known in the art.

Referring generally to FIG. 1; the GPS (Global Positioning System) and proximity radar antenna configuration of a fuze 100, as is known in the art, is illustrated. Proximity radar antenna 102 is located in the nose of the fuze 100. GPS antenna patches 101 are located on the side/fuselage of the fuze 100. In this configuration, the performance of proximity radar antenna 102 is optimal. However, in this configuration, GPS antenna patches 101 experience performance degradation such as carrier-phase roll-up.

Figure 2:
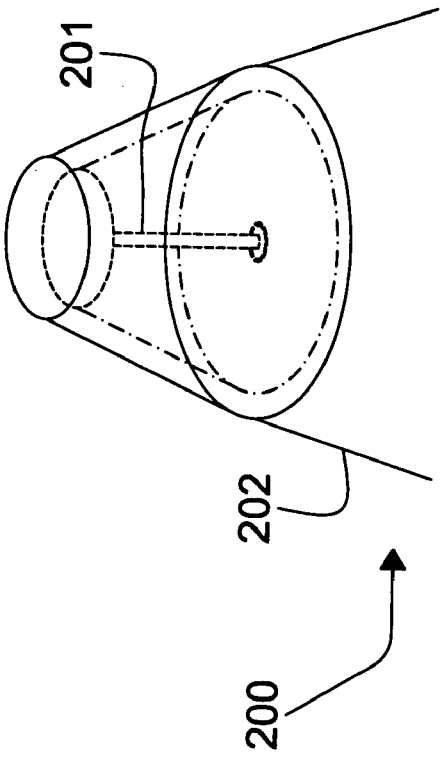
FIG. 2 is a block diagram illustrating the GPS and proximity radar antenna configuration of a fuze, as is known in the art.

Referring now to FIG. 2; the GPS and proximity radar antenna configuration of a fuze 200, as is known in the art, is illustrated. GPS top-loaded monopole 201 is located in the nose of the fuze 200. Proximity radar antenna 202 is located on the side/fuselage of the fuze 200. In order to realize azimuthal symmetry for the proximity antenna, a warp around microstrip band antenna, or similar antenna, would need to be used. These have the following disadvantages: very low gain, additional steps required for antenna integration onto the fuse of projectile fuselage, the need for a radome cowling for environmental protection and finally complicated RF interconnect into the proximity radar system. Other side mounted elements, such as microstrip patches will not have the required monopole like pattern, and azimuthal symmetry, that features an axial null, which is necessary for optimal fuse operation. In this configuration, the performance of GPS top-loaded monopole 201 is optimal. However, in this configuration, proximity radar antenna 202 experiences performance degradation.

Figure 3:
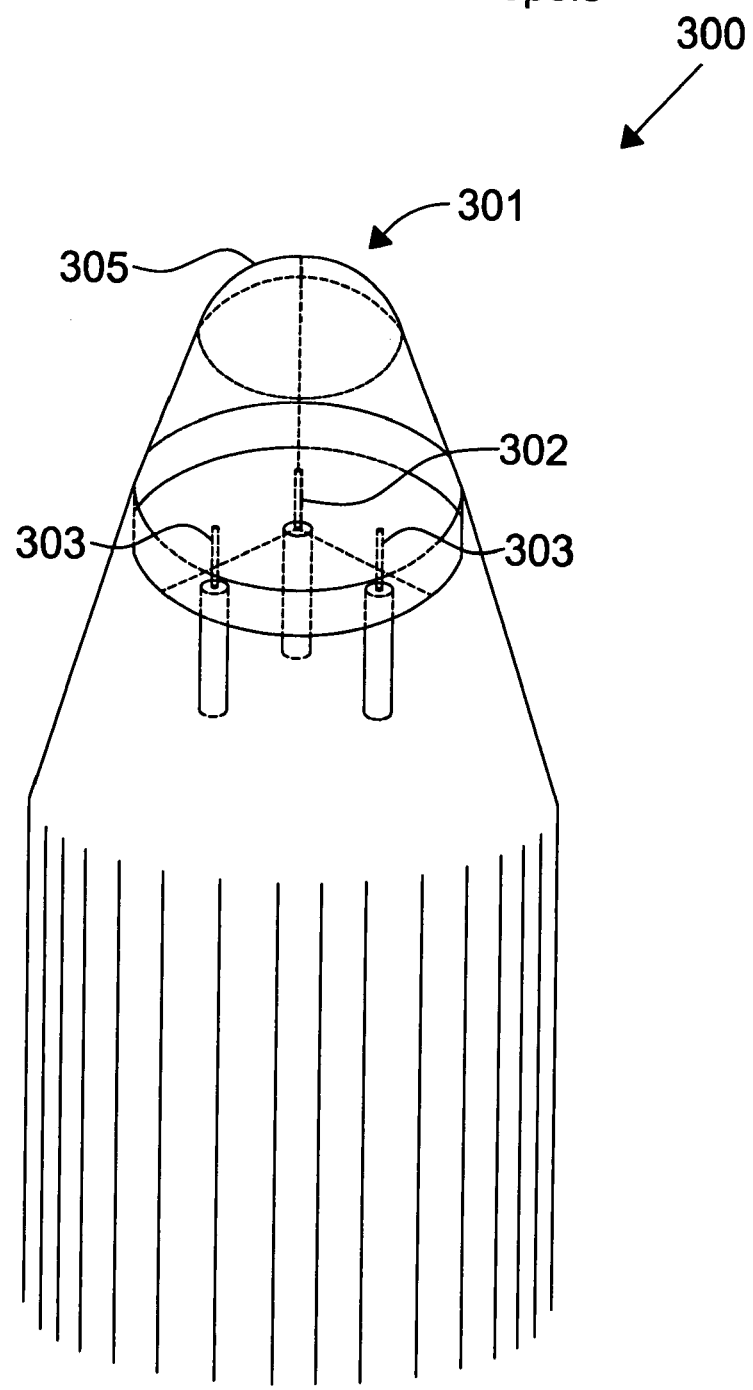
FIG. 3 is a block diagram illustrating a fuze utilizing a proximity radar antenna co-located with GPS DRA fuze in accordance with an exemplary embodiment of the present invention.

Referring now to FIG. 3; a fuze application 300 utilizing proximity radar antenna 302 co-located with GPS DRA (Dielectric Resonator Antenna) fuze 301 in accordance with an exemplary embodiment of the present invention is illustrated. GPS DRA fuze 301 is comprised of DRA dielectric cone 305 and feed probes 303 located within DRA dielectric cone 305.

Proximity radar antenna 302 is located within GPS DRA fuze 301 and can be thought of as a dielectrically loaded monopole antenna.

GPS DRA fuze 301 may operate in the L1 frequency. GPS DRA fuze 301 may have a form factor of approximately 30 millimeters by 30 millimeters. The dielectric material of DRA dielectric cone 305 may have a dielectric constant of $\epsilon \approx 25$. GPS DRA fuze 301 may have an E-field null at the center of DRA dielectric cone 305. Feed probes 303 may have a height of approximately 30 millimeters. Proximity radar antenna 302 may be a monopole. Proximity radar 302 may be electrically shortened to resonate in the C-Band. Proximity radar 302 may have a height of approximately 30 millimeters. GPS DRA fuze 301 may be electrically isolated from proximity radar antenna 302.

Fuze application 300 provides a nose-mounted fuze antenna capable of optimal GPS and proximity radar operations. Due to the $HE_{11\delta}$ mode structure (driven by the feed probes) of GPS DRA fuze 301 an E-field null exists at the center of the DRA dielectric cone 305, allowing for benign insertion of proximity radar antenna 302. This also allows GPS DRA fuze 301 and proximity radar 302 to remain electrically isolated. The high dielectric constant of DRA dielectric cone 305 permits the electrically shortened proximity radar antenna 302 to resonate in the C-Band.

Nesting proximity radar antenna 302 inside GPS DRA fuze 301 allows both antennas to be mounted on the fuze nose while simultaneously reducing the total amount of space occupied by antennas. GPS DRA fuze 301 maintains a forward-looking CP (circular polarization) pattern while proximity antenna 302 maintains a desirable monopole pattern. GPS DRA fuze 301 and proximity radar antenna 302 are able to be electrically isolated from each other because proximity radar antenna 302 is located within the E-field null zone within GPS DRA fuze 301. Utilization of dielectric materials with a dielectric constant of $\epsilon \approx 25$ for DRA dielectric cone 305 allows for a GPS L1 antenna within a 30 millimeter by 30 millimeter form factor.

Figure 4:
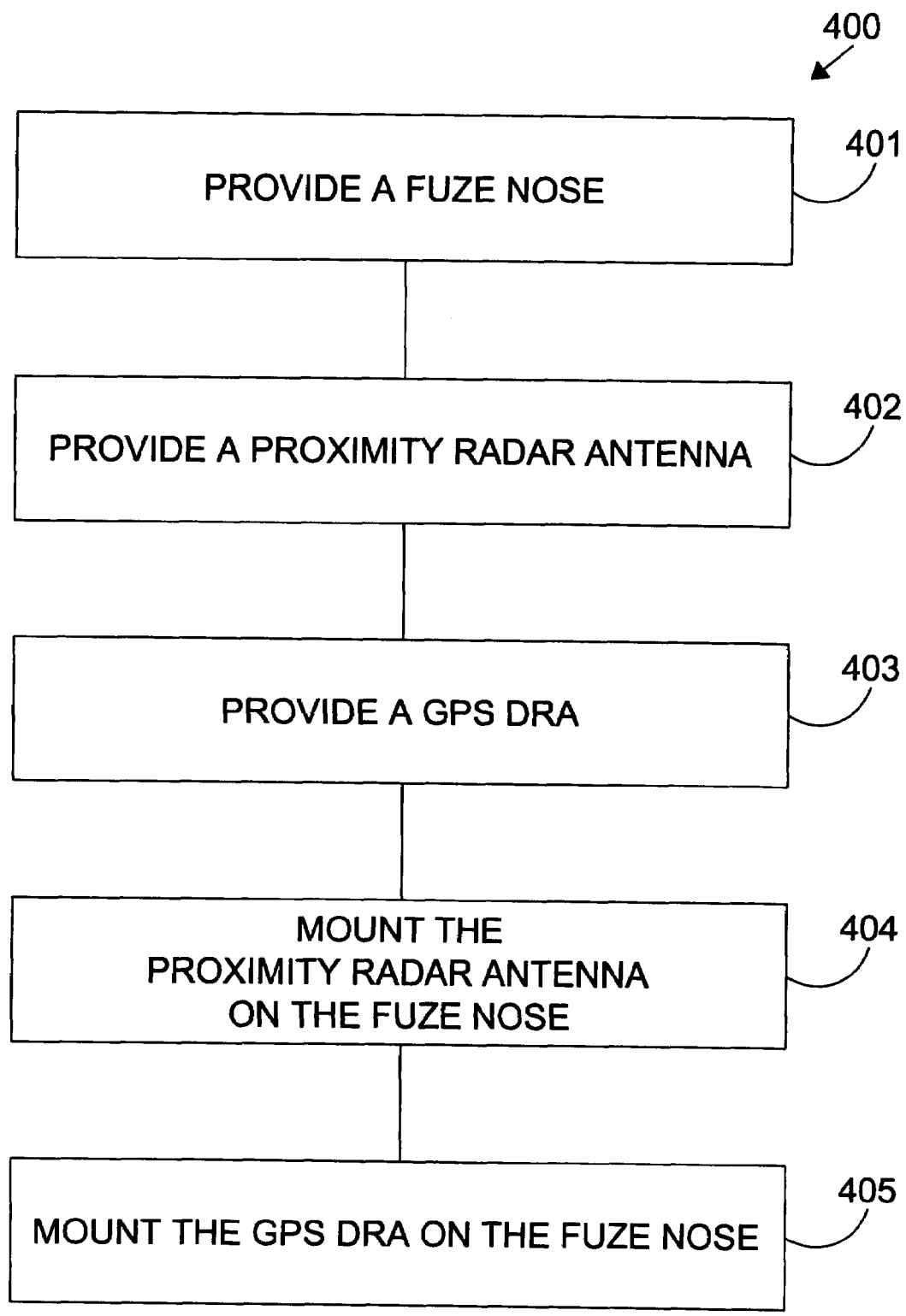
FIG. 4 is a flowchart illustrating a method of providing a fuze capable of optimal GPS and proximity radar operations in accordance with an exemplary embodiment of the present invention.

Referring now to FIG. 4, a method 400 of providing a fuze capable of optimal GPS and proximity radar operations in accordance with an exemplary embodiment of the present invention is shown. In step 401, a fuze nose is provided. The fuze nose may have a form factor of 30 millimeters by 30 millimeters. In step 402, a proximity radar antenna is provided. The proximity radar antenna may be a monopole. The proximity radar antenna may have a height of approximately 30 millimeters. The proximity radar antenna may resonate in the C-Band. In step 403, a GPS DRA is provided. The GPS DRA may have a form factor of 30 millimeters by 30 millimeters. The GPS DRA may comprise two feed probes located within a DRA cone having a dielectric constant of $\epsilon \approx 25$. The feed probes may have a height of approximately 30 millimeters. The GPS DRA may have a $HE_{11\delta}$ mode structure (driven by the feed probes). An E-field null may exist at the center of the dielectric cone of the GPS DRA. In step 404, the GPS DRA is mounted on the fuze nose. The proximity radar antenna may be mounted in the center of the dielectric cone of the GPS DRA. The proximity radar antenna may be mounted in the E-field null in the center of the dielectric cone of the GPS DRA. The proximity radar antenna and the GPS DRA may be electrically isolated from each other.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An antenna system, comprising:
    a proximity radar antenna; and
    a GPS (Global Positioning System) DRA (Dielectric Resonator Antenna);
    wherein the proximity radar antenna is located within the GPS DRA and is electrically isolated from the GPS DRA.

2. The antenna system as claimed in claim 1, wherein the GPS DRA comprises:
    at least one feed probe; and
    a DRA cone;
    wherein the feed probe is mounted within the DRA cone.

3. The antenna system as claimed in claim 2, wherein the DRA cone comprises a dielectric cone.

4. The antenna system as claimed in claim 3, wherein the dielectric cone comprises a dielectric material with a dielectric constant of $\epsilon \approx 25$.

5. The antenna system as claimed in claim 3, wherein the GPS DRA has a $HE_{11\delta}$ mode structure driven by the feed probe and an E-field null exists at the center of the dielectric cone.

6. The antenna system as claimed in claim 5, wherein the proximity radar antenna is mounted in the center of the dielectric cone.

7. The antenna system as claimed in claim 6, wherein the proximity radar antenna is a monopole and the GPS DRA comprises two feed probes.

8. The antenna system as claimed in claim 6, wherein the proximity radar antenna and the GPS DRA are electrically isolated from each other.

9. The antenna system as claimed in claim 6, wherein the proximity radar antenna is electrically shortened.

10. The antenna system as claimed in claim 9, wherein the proximity radar antenna resonates in the C-Band.

11. The antenna system as claimed in claim 10, wherein the GPS DRA cone is a component of a fuze nose, the form factor of the fuze nose is approximately 30 millimeters by 30 millimeters, and the height of the proximity radar antenna and feed probe is no greater than approximately 30 millimeters.

12. A method of providing an antenna system, comprising the steps of:
    providing a proximity radar antenna;
    providing a GPS (Global Positioning System) DRA (Dielectric Resonator Antenna); and
    mounting the proximity radar antenna within the GPS DRA such that the proximity radar antenna is electrically isolated from the GPS DRA.

13. The method of claim 12, wherein the GPS DRA comprises:
    at least one feed probe; and
    a DRA cone;
    wherein the feed probe is mounted within the DRA cone.

14. The method of claim 13, wherein the DRA cone comprises a dielectric cone.

15. The method of claim 14, wherein the dielectric cone comprises a dielectric material with a dielectric constant of $\epsilon \approx 25$.

16. The method of claim 14, wherein the GPS DRA has a $HE_{11\delta}$ mode structure driven by the feed probe and an E-field null exists at the center of the dielectric cone.

17. The method of claim 16, wherein the proximity radar antenna is mounted in the center of the dielectric cone.

18. The method of claim 17, wherein the proximity radar antenna is a monopole and the GPS DRA comprises two feed probes.

19. The method of claim 17, wherein the proximity radar antenna and the GPS DRA are electrically isolated from each other.

20. The method of claim 17, wherein the proximity radar antenna is electrically shortened.

21. The method of claim 20, wherein the proximity radar antenna resonates in the C-Band.

22. The method of claim 21, wherein the GPS DRA cone is a component of a fuze nose, the form factor of the fuze nose is approximately 30 millimeters by 30 millimeters, and the height of the proximity radar antenna and feed probe is no greater than approximately 30 millimeters.

23. A system for fuzing, comprising: a GPS (Global Positioning System) DRA (Dielectric Resonator Antenna), comprising:
  a dielectric DRA cone which has a form factor of approximately 30 millimeters by 30 millimeters and is comprised of a dielectric material with a dielectric constant of $\epsilon \approx 25$; and
  one or more feed probes, which have a height of no greater than approximately 30 millimeters, mounted within the dielectric DRA cone;
  wherein the GPS DRA has a $HE_{11\delta}$ mode structure driven by the feed probes and an E-field null exists at the center of the dielectric cone;
an electrically shorted monopole proximity radar antenna which has a height of
  no greater than approximately 30 millimeters and resonates in the C-Band;
wherein the GPS DRA and the electrically shortened monopole proximity radar antenna are components of a fuze nose, the electrically shortened monopole proximity radar antenna is mounted in the center of the dielectric cone of the GPS DRA, and the electrically shortened monopole proximity radar antenna is electrically isolated from the GPS DRA.

* * * * *